United States Patent
Richard et al.

(10) Patent No.: US 8,326,853 B2
(45) Date of Patent: Dec. 4, 2012

(54) VIRTUAL WORLD IDENTITY MANAGEMENT

(75) Inventors: Dettinger D. Richard, Rochester, MN (US); Kulack A. Frederick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 760 days.

(21) Appl. No.: 12/356,168

(22) Filed: Jan. 20, 2009

(65) Prior Publication Data
US 2010/0185640 A1 Jul. 22, 2010

(51) Int. Cl.
G06F 17/30 (2006.01)
(52) U.S. Cl. .......................... 707/758; 715/757
(58) Field of Classification Search ............. 715/757
See application file for complete search history.

(56) References Cited

U.S. PATENT DOCUMENTS

| | | | | |
|---|---|---|---|---|
| 7,840,903 B1* | 11/2010 | Amidon et al. | | 715/757 |
| 2006/0246972 A1* | 11/2006 | Thomas et al. | | 463/4 |
| 2008/0001951 A1* | 1/2008 | Marks et al. | | 345/474 |
| 2008/0252637 A1* | 10/2008 | Berndt et al. | | 345/419 |
| 2008/0301737 A1* | 12/2008 | Hjelmeland Almas et al. | 725/61 |
| 2009/0288002 A1* | 11/2009 | Hamilton et al. | | 715/706 |

OTHER PUBLICATIONS

"HP Virtual Identity and Profile Broker: A Communications, media and entertainment solution brief from HP," (Oct. 2007) 4 pages, retrieved from: http:/www.hp.com/go/cme.

* cited by examiner

Primary Examiner — Tuyetlien Tran
Assistant Examiner — Peiyong Weng
(74) Attorney, Agent, or Firm — Patterson & Sheridan LLP

(57) ABSTRACT

Embodiments of the invention improve the ability for users of an immersive virtual environment to manage and change their avatars or avatar profiles, including their behavior, during their virtual experience. In one embodiment, a user associates each avatar or avatar profile they control or own with a task from a predetermined set of tasks or purposes. A virtual world identity manager (VWIM) may collect and evaluate data about the virtual experience of the user, including virtual environment, virtual behavior, and virtual interaction with other users. Using this information, the VWIM may assist the user with identity management, including notifying the user of an identity or behavioral mismatch, and dynamically prompting the user to change identity or behavior, and recommending appropriate identities or behaviors for the user.

13 Claims, 8 Drawing Sheets

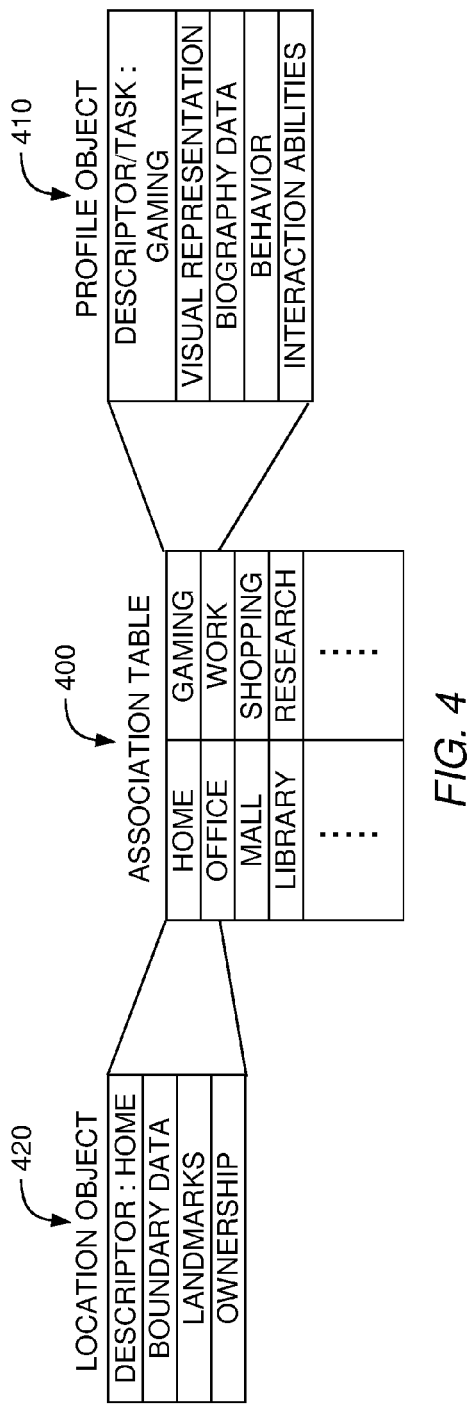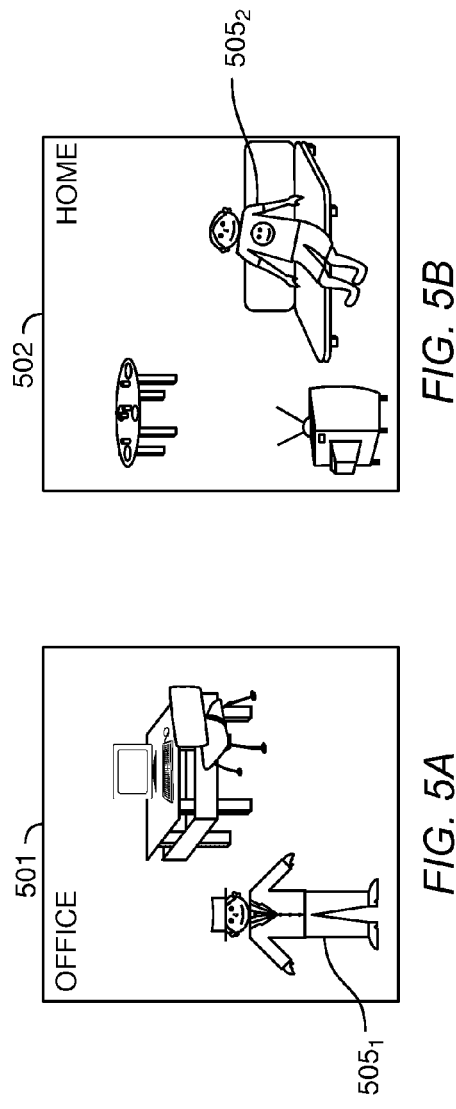

VIRTUAL WORLD IDENTITY MANAGEMENT

BACKGROUND OF THE INVENTION

1. Field of the Invention

Embodiments of the invention relate to immersive virtual environments. More specifically, embodiments of the invention relate to identity management within an immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using, for example, text messages sent between avatars, real-time voice communication, gestures displayed by avatars, and symbols visible in the virtual world.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plot and events continue to occur as users enter (and exit) the virtual world.

Virtual worlds may provide an opportunity for users to create an avatar for various tasks. That is, users may create one avatar for gaming or entertainment purposes and another avatar for business or education purposes. Users may also create avatars with various profiles for the various tasks. That is, a user may create an avatar with different attributes, including looks and behaviors, for various tasks or purposes. Much like the real world where a person may adopt slightly different clothing and behaviors as they move between the workplace, their home life, and social events, users of virtual worlds may use different profiles to further their immersive virtual experience.

SUMMARY OF THE INVENTION

The present invention generally provides methods for managing the identity of avatars in a virtual world.

One embodiment provides a computer-implemented method of assisting users in the management of avatars in a virtual environment. The method includes storing a plurality of avatar profiles, each profile defining attributes for a respective avatar; collecting information about a virtual experience of a user controlling an avatar in the virtual environment comprising virtual locations, virtual objects, and other avatars; wherein the avatar has a first profile of the plurality of profiles applied thereto; and creating associations between the first profile and the collected information to define profile management criteria. While monitoring the avatar interacting with the virtual environment, the method includes determining when one or more of the profile management criteria are satisfied based on a current state of the avatar relative to the virtual environment. Upon determining that one or more of the profile management criteria are satisfied, the method includes dynamically selecting a second profile to be applied to the avatar to replace the first profile.

Another embodiment provides a computer readable medium containing a program which, when executed, performs the foregoing method.

Another embodiment provides a computer-implemented method of assisting users in the management of avatars in a virtual environment. The method includes providing a virtual manifestation of a user in a virtual environment. While monitoring the virtual manifestation interacting with the virtual environment, the method determines when one or more identity management criteria are satisfied based on a current state of the virtual manifestation relative to the virtual environment. Upon determining that one or more of the identity management criteria are satisfied, the method dynamically selects one or more changes to apply to the virtual manifestation to produce a modified virtual manifestation in the virtual environment.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates a schematic diagram of an association data structure used by a virtual world identity manager in detecting anomalies and determining appropriate actions.

FIG. 5A illustrates an example of an avatar profile of the user in a location in the virtual world, according to one embodiment of the invention.

FIG. 5B illustrates an example of a different avatar profile of the user in a different location in the virtual world, according to one embodiment of the invention.

DETAILED DESCRIPTION OF THE PREFERRED EMBODIMENTS

Figure 1:
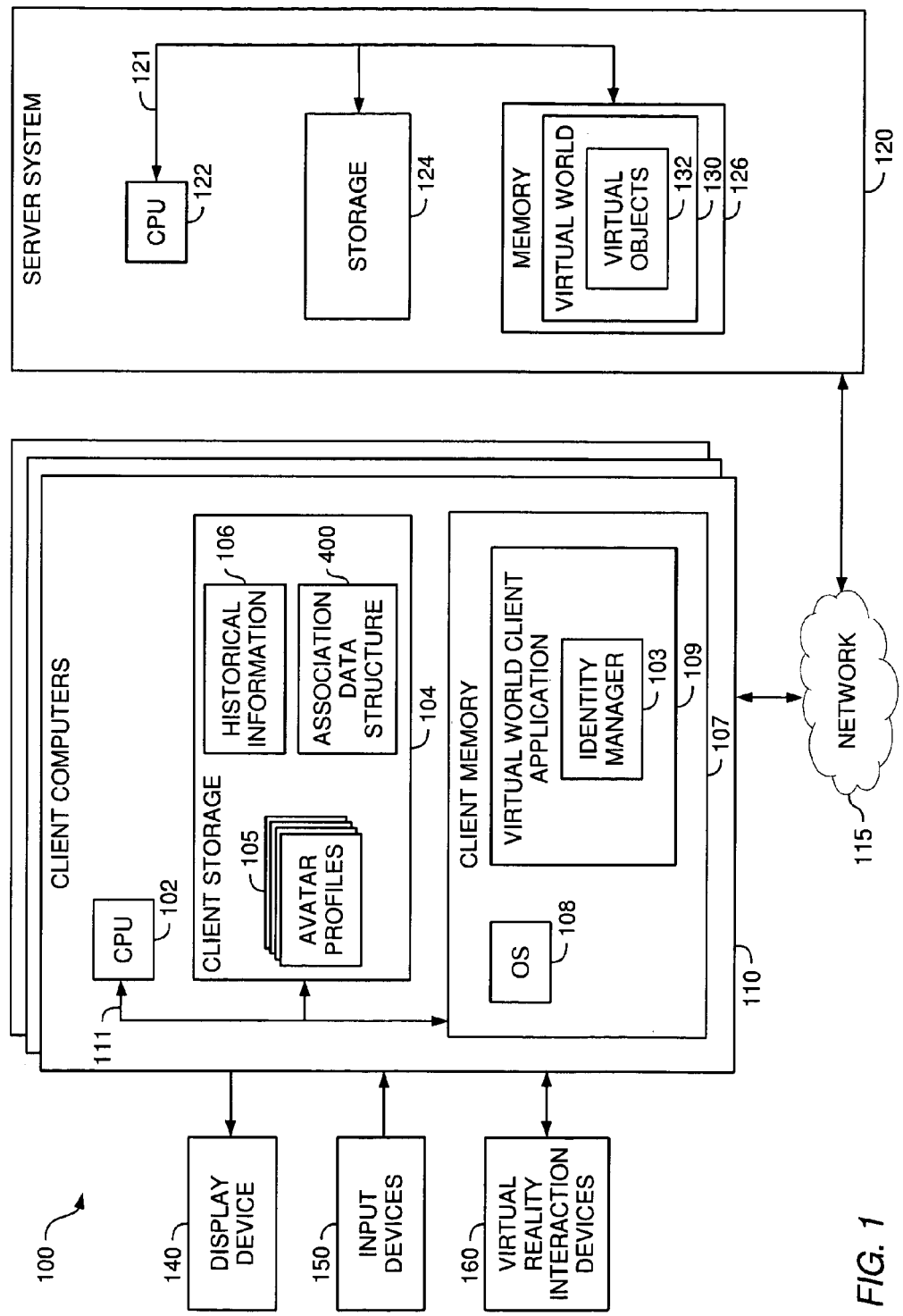
FIG. 1 is a block diagram that illustrates a client server view of a computing environment configured for displaying avatars and monitoring the avatars in a virtual world, according to one embodiment of the invention.

Virtual worlds typically provide a simulated environment which users may inhabit and in which the users may interact with one another via avatars. In real life, people often change appearances and behaviors when interacting with different people at different times or in different environments. For example, a person may wear a business suit at work and speak formally to coworkers; while at home, the same person may wear a t-shirt and shorts and speak informally to family members. As such, users of virtual worlds may also want to change their avatar or profile of their avatar for a given situation or virtual location to further their immersive virtual experience.

Embodiments of the invention improve the ability for users of an immersive virtual environment to manage and change their avatars or avatar profiles, including behavior of the avatars or profiles, during their virtual experience. In one embodiment, a user associates each avatar or avatar profile they control or own with a task from a predetermined set of tasks or purposes. A virtual world identity manager (VWIM) may assist in identity management by collecting and evaluating data about the virtual environment, including current profile or task of an avatar, current virtual locations, and profiles or tasks expressed by avatars of other users in the virtual locations. Specifically, the VWIM may track the virtual locations visited by a user. Over time, as the user visits various locations, the VWIM may collect information about which profiles or avatars are typically employed by the user in a given location. The VWIM may make associations between profiles and locations in the virtual world. These associations may then be used to dynamically select profiles for the user depending on the location of the user in the virtual world.

Further, in one embodiment, the VWIM may collect and evaluate information about virtual behavior and interaction, including location of the avatar or interaction of the avatar with other virtual world elements (i.e., virtual objects and other avatars). For example, the VWIM may monitor and track text conversations of a user, including conversational topics and grammar (e.g., use of slang, profanity, and spelling). Over time, as the user has various conversations with various users in various places, the VWIM collects more information about the behavior and interaction of the user. Using this collected information, the VWIM may manage the user's interaction with other users by, for example, recommending alternative expressions to the user during conversations.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 shows a block diagram that illustrates a client-server view of computing environment 100, for one embodiment. As shown, the computing environment 100 includes client computers 110, network 115, and server system 120. In one embodiment, the computer systems illustrated in FIG. 1 are included to be representative of existing computer systems, e.g., desktop computers, server computers, laptop computers, and tablet computers. The computing environment 100 illustrated in FIG. 1, however, is merely an example of one computing environment. Embodiments of the invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, and tablet computers. However, the software applications described herein are not limited to any currently existing computing environment or programming language, and may be adapted to take advantage of new computing systems as they become available.

In one embodiment, the server system 120 includes a central processing unit (CPU) 122, which obtains instructions and data via a bus 121 from memory 126 and storage 124. The processor 122 could be any processor adapted to support the methods of the invention. The memory 126 is any memory sufficiently large to hold the necessary programs and data structures. The memory 126 can be one or a combination of memory devices, including Random Access Memory, non-volatile or backup memory, (e.g., programmable or Flash memories, read-only memories, etc.). In addition, the memory 126 and storage 124 may be considered to include memory physically located elsewhere in the server system 120, for example, on another computer coupled to the server system 120 via the bus 121. The server system 120 may be operably connected to the network 115, which generally represents any kind of data communications network. Accordingly, the network 115 may represent both local and wide area networks, including the Internet.

As shown, the memory 126 includes virtual world 130. In one embodiment, the virtual world 130 may be a software application that accepts connections from multiple clients, allowing users to explore and interact with an immersive virtual environment by controlling the actions of an avatar. Illustratively, the virtual world 130 includes virtual objects 132. The virtual objects 132 represent the content present within the environment provided by the virtual world 130, including both elements of the "world" itself as well as elements controlled by a given user.

As shown, each client computer 110 includes a CPU 102, which obtains instructions and data via a bus 111 from client memory 107 and client storage 104. The CPU 102 is a programmable logic device that performs all the instruction, logic, and mathematical processing in a computer. The client storage 104 stores application programs and data for use by the client computer 110. The client storage 104 includes, for example, hard-disk drives, flash memory devices, and optical media. As stated, the client-server environment is merely illustrative and other environments are contemplated (e.g., a peer to peer environment). The client computer 110 is operably connected to the network 115.

As shown, the client storage 104 includes avatar profiles 105, historical information 106, and association data structure 400. Avatar profiles 105 represent one or more sets of characteristics and attributes of an avatar. For example, avatar profiles 105 may include clothing, accessories, visual representation, publicly available information, behavior, and interaction abilities. Visual representation data relates to the "physical" appearance of the avatar, including the face, body, and other such features that are visible to the users of the virtual world. Publicly available information is information that may be visible or accessible by the users of the virtual world (e.g., biography details such as hobbies, name, birthplace, and birthday). Behavior information may include behavioral traits of the avatar, including mood, emotions, habits and other such characteristics. Interaction abilities include information about how the avatar may communicate or interact with users or virtual elements (e.g., written language, verbal language, gestures, grunts, facial expressions). For example, an avatar without arms may not be able to use hand gestures but could possible communicate with their face or through the user's typing or voice. Further, avatar profiles 105 may include user preferences for sound presentation (i.e., sound effects, music, etc.) and physics rules within the virtual world, and the like. For example, physics rules within the virtual world affects how the avatar experiences the virtual environment and may include allowing the user's avatar to "fly," restricting "walking" or "running" movements to realistic speeds, allowing the avatar to pass through virtual walls, etc. Historical information 106 represents information collected, including real-time information, about the virtual experience of a user by a virtual world identity manager (VWIM) 103 of a virtual world client application 109. For example, information may be collected about the avatar profiles 105 used at given virtual locations, behavioral traits during interaction with others users, and information about other users, including profile of these other users at the given locations.

Association data structure 400 represents a data structure that defines profile management criteria used by the VWIM 103 in detecting that a current state of the avatar merits determining a modification to the user's virtual manifestation. For example, the associations defined in the data structure 400 may reflect various statistical observations (e.g., which profile is typically used at a given location) derived from the information 106 collected by the VWIM 103. As will be appreciated by one of ordinary skill in the art, the avatar profiles 105, historical information 106, and association data structure 400 may be stored elsewhere in the computing environment 100 (e.g., by other clients or by the server storage 124).

The client memory 107 includes an operating system (OS) 108 and the virtual world client application 109. The operating system 108 is the software used for managing the operation of the client computer 110. Examples of the OS 108 include UNIX, a version of the Microsoft Windows® operating system, and distributions of the Linux® operating system. (Linux is a trademark of Linus Torvalds in the United States and other countries.)

In one embodiment, the client application 109 provides a software program that allows the user to connect to the virtual world 130, and once connected, to explore and interact with the virtual world 130. Further, the client application 109 may be configured to generate and display a visual representation, generally referred to as the avatar, of the user within the immersive environment. The avatar of the user is generally visible to other users in the virtual world, and the user may view avatars representing the other users. The client application 109 may also be configured to generate and display the immersive environment to the user and to transmit the user's desired actions to the virtual world 130 on the server 120. Such a display may include content from the virtual world determined from the user's line of sight at any given time. For the user, the display may include the avatar of that user or may be a camera eye where the user sees the virtual world through the eyes of the avatar representing this user.

Figure 2:
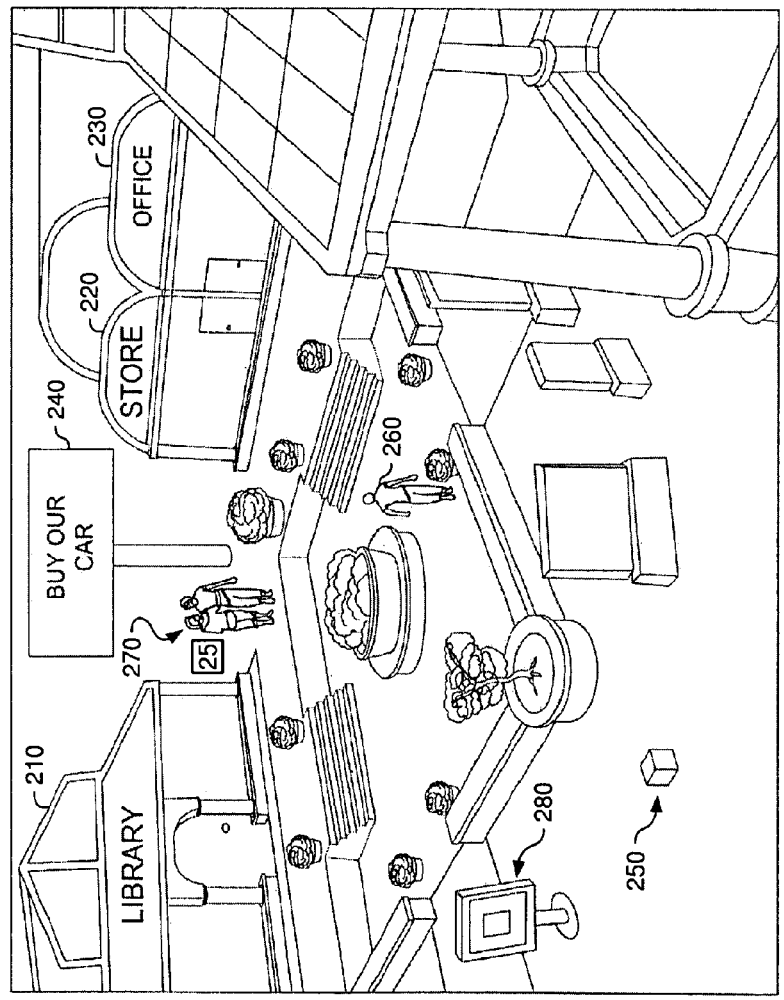
FIG. 2 illustrates an example display of a user participating via one of the avatars in the virtual world, according to one embodiment of the invention.

For instance, using the example illustrated in FIG. 2, the virtual objects 132 may include a box 250, a store 220, and a library 210. More specifically, FIG. 2 illustrates a user display 200 for a user participating in a virtual world, according to one embodiment. In this example, the user is represented by a user avatar 260, and other users are represented by a third party avatar 270. Within the virtual world 130, avatars can interact with other avatars. For example, the user with the user avatar 260 can click on the third party avatar 270 to start an instant message conversation with the other user associated with the third party avatar 270. The user may interact with elements displayed in the user display 200. For example, the user may interact with the box 250 by picking it up and opening it. The user may also interact with a kiosk 280 by operating controls built into the kiosk 280 and requesting information. The user may also interact with a billboard 240 by looking at it (i.e., by positioning the line of sight directly towards the billboard 240). Additionally, the user may interact with larger elements of the virtual world. For example, the user may be able to enter the store 220, the office 230, or the library 210.

The user may view the virtual world using a display device 140, such as an LCD or CRT monitor display, and interact with the client application 109 using input devices 150 (e.g., a keyboard and a mouse). Further, in one embodiment, the user may interact with the client application 109 and the virtual world 130 using a variety of virtual reality interaction devices 160. For example, the user may don a set of virtual reality goggles that have a screen display for each lens. Further, the goggles can be equipped with motion sensors that cause the view of the virtual world presented to the user to move based on the head movements of the individual. As another example, the user can don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

As shown, the client application 109 includes the virtual world identity manager (VWIM) 103. In one embodiment, a user associates each avatar profile (e.g., the profiles 105) they control or own with a task from a predetermined set of tasks or purposes (e.g., work, gaming, research, school, silly, adult). For example, a user may select one profile to be associated with gaming, another profile with work, and a third profile with research. Alternatively, a user may own/control a plurality of avatars and may associate each avatar they control or own with a task from a predetermined set of tasks or purposes. In general, the combination of a selected profile and task results in a given virtual manifestation of the user in the virtual world. At any time, the user may switch between the task or the avatar being applied or employed, thereby changing the user's virtual manifestation. The VWIM 103 may assist users with managing and changing avatars or avatar profiles 105, including their behavior, in a virtual environment. That is, the VWIM 103 may provide a mechanism for helping users with changes in the "look and feel" and behavior of an avatar or avatar profile. The VWIM 103 assists in this identity management by collecting information about the experience of a user, including virtual environment (e.g., locations visited by the user), virtual behavior, and virtual interaction with other users (e.g., text conversations). Using this information, the VWIM 103 may assist the user with identity management, including notifying the user of an identity or behavioral mismatch, and dynamically prompting the user to change identity or behavior, and recommending appropriate identities or behaviors for the user.

Figure 3:
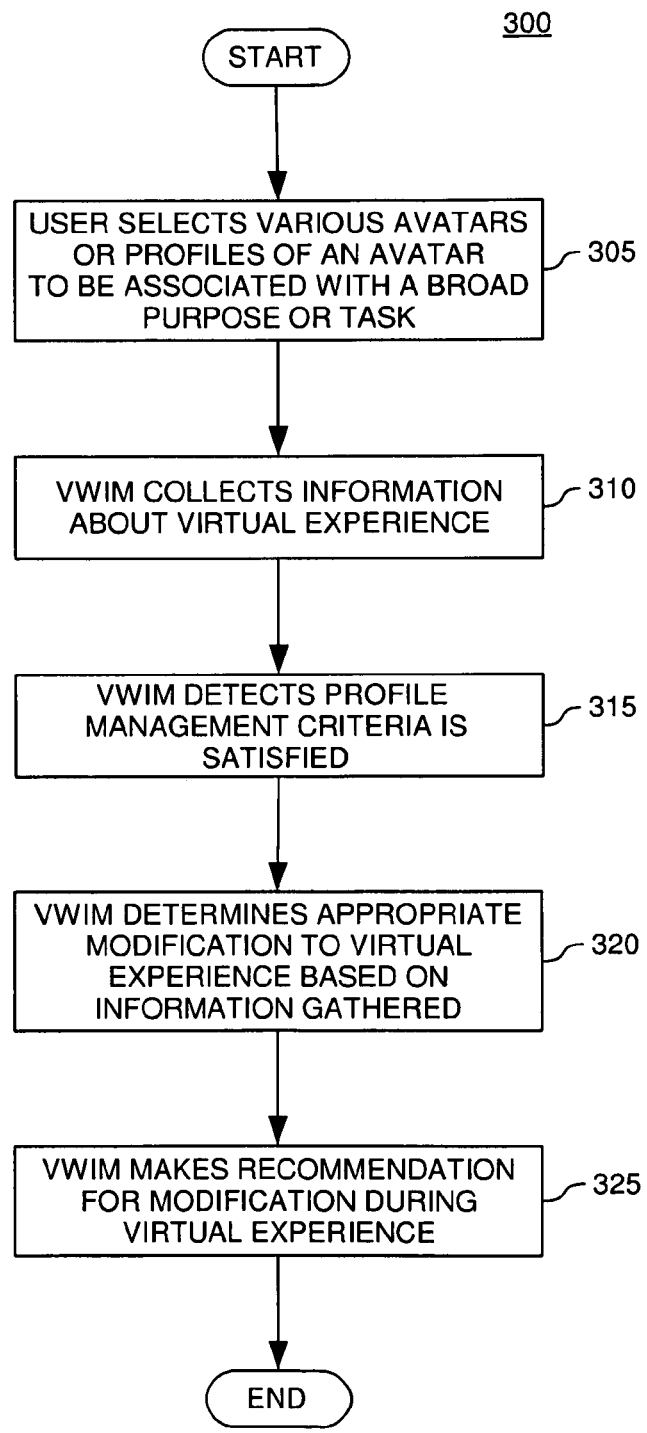
FIG. 3 illustrates a method of managing the virtual experience of the user, according to one embodiment of the invention.

FIG. 3 illustrates a method 300 of managing the experience of the user in the virtual world, according to one embodiment of the invention. As shown, the method 300 begins at step 305 where the user selects various tasks from a predetermined set of tasks (e.g., gaming, business, research), to be associated with a given avatar profile. Alternatively, the user may select various tasks to be associated with a given avatar. At step 310, the VWIM collects information, including real-time information, about the virtual experience of the user. For example, the VWIM may collect information about virtual locations, the current avatars (including the avatar of the user) at these locations, and the behavior and interaction (e.g., conversations, movements, and expressions) of these avatars at these locations. For example, the VWIM may monitor and track actions of the user involving an avatar, including how an avatar travels or moves (e.g., walks, rides an animal, or uses vehicle), whether the user (through the avatar) interacts with a given group or other user, and whether an avatar shows visual expressions (i.e., emotions) and, if so, when and to whom. Other collected information includes, e.g., time of day, internet protocol (IP) address of the user, avatar attributes, virtual objects in the vicinity of the user's avatar, proximity of other avatars to the user's avatar, the behavior of other avatars in the vicinity of the user's avatar, attributes of the respective profiles of the other avatars in the vicinity of the user's avatar. In this regard it should be noted that it is specifically contemplated that, at least in one embodiment, it is possible to collect information from and about other avatars in the virtual world.

In one embodiment, the VWIM may make associations between various elements of the collected information and the profile (or avatar) being used during the virtual experience. According to one embodiment, the associations derived from the collected information are statistical conclusions. For example, the collected information may reflect that the user typically elects to apply profile X to avatar Y in location Z, wherein location Z is a predefined region or structure. In addition to driving statistics regarding the user's own elections and preferences in a given virtual context, the collected information may also be used to derive statistics regarding how other avatars express themselves in given virtual contexts. For example, the collected information may reflect that other avatars predominately dress formally in location Z. The associations may be stored in one or more data structure accessible to the VWIM, such as the association data structure 400 shown in FIG. 1 and described in more detail below with respect to FIG. 4. These associations define profile management criteria and may be used in managing the virtual manifestation of the user. Managing the virtual manifestation of the user includes detecting that one or more of the profile management criteria are satisfied based on a current state of the avatar relative to the virtual environment, and then dynamically identifying an appropriate modification to the virtual experience. Thus, at step 315, using the information gathered, the VWIM may determine that one or more of the profile management criteria are satisfied. Consequently, at step 320, the VWIM may determine an appropriate modification to the virtual experience. An appropriate modification includes, for example, selecting a different profile to be applied to the avatar to replace the profile currently being used. Alternatively, or additionally, the appropriate modification includes a change in the behavior (e.g., communication, gesture, etc.) of the avatar. For example, the modification could include dynamically prompting the user to greet friends when near them in a virtual environment. As another example, the modification could include expressing a smile to a friend. At step 325, the VWIM notifies the user of the recommendation for an appropriate modification during the virtual experience. At this step, the VWIM may also notify the user of the criteria which triggered the recommendation. Alternatively, the VWIM may automatically apply the recommendation without first notifying the user. It is contemplated that, at least in one embodiment, whether the user is first notified or whether the recommendation is automatically applied, is user-configurable. In one embodiment, the VWIM may dynamically recommend an appropriate action before an incongruent action is initiated or completed by the user. For example, assume a user interacts with a group of co-workers in a work location. Further, assume incidents of profanity in prior conversations with this group are very low (as derived from the collected information). Using this information, the VWIM may prompt the user when the user attempts to send a message with profanity. In the case where modifications are applied automatically, the VWIM may automatically remove the profanity before the message is sent to the group by the virtual world client application.

FIG. 4 illustrates one embodiment of an association data structure 400 that defines profile management criteria used by the virtual world identity manager in detecting that a current state of the avatar merits determining a modification to the user's virtual manifestation. As noted above, the associations defined in the data structure 400 may reflect various statistical observations derived from the information collected by the VWIM. Illustratively, association table 400 represents a data structure of associations between locations and profiles. For example, based on the collected information, it may be determined that a particular profile is the most statistically common profile for a given location. This statistical association may be based on the user's own selection of a given profile in the given location, and/or the profiles applied by other users to their respective avatars in the given location. The location in the data structure 400 is represented by a location object 420 and the profile is represented by a profile object 410. Thus, the location object 420 represents a data structure containing information about a particular location in the virtual world. Illustratively, the location object 420 includes a descriptor (e.g., name of area or building), boundary markers (e.g., the virtual plat of land), landmarks (e.g., mountains, trees, buildings near or at location), and ownership data (e.g., land owned by user X). The profile object 410 represents a data structure containing information about an avatar profile controlled or owned by the user. For example, in one embodiment, each profile object corresponds to a respective one of the profiles 105 shown in FIG. 1. Illustratively, the profile object 410 includes a descriptor or task describing the profile object 410, and information about characteristics and attributes of the avatar; including visual representation (e.g., "physical" characteristics), clothing or fashion, publicly available information (e.g., biography data), behavior, and interaction abilities (e.g., text, visual gestures, voice). As stated, the associations of location and profiles are merely illustrative and other elements or selection criteria (e.g., elements of the virtual environment), including combinations of the criteria, may be associated to profiles or other elements of the virtual environment. For example, the VWIM may make associations between a profile of a user and the vicinity of certain other users. Another example could involve the linking of an IP address to a specific avatar profile (e.g., work computer to work profile, home computer to home profile) or linking an IP address to a specific virtual location.

FIG. 5A illustrates an example of an avatar profile of the user in a location in the virtual world, according to one embodiment of the invention. In this example, the user is represented by an avatar profile $505_1$ and is located in a business environment 501. Avatar profile $505_1$ may represent the characteristics and attributes of an avatar used for the task or purpose of work, including clothing, visual representation, publicly available information, behavior, and interaction abilities. As shown, profile $505_1$ represents a man in a business suit with a hat. Here, business environment 501 represents an office of the user.

FIG. 5B illustrates an example of the user employing a different avatar profile in a different location in the virtual world, according to one embodiment of the invention. Specifically, the user is represented by an avatar profile $505_2$ and is located in a non-work location, or home 502. Avatar profile $505_2$ may represent the characteristics and attributes of an avatar used for the task or purpose of recreation or gaming, including clothing, visual representation, publicly available information, behavior, and interaction abilities. As shown, profile $505_2$ represents a man in shorts and a t-shirt. Here, the home 502 represents a recreational place or equivalent of the user.

As stated, the VWIM may monitor the virtual experience of a user, including virtual locations visited by the user, profiles employed by the user at these locations, and tasks associated with these profiles. For example, if the user commonly used the profile $505_1$ at the work 501 and the profile $505_2$ at the home 502, then the VWIM may associate the work profile $505_1$ with the office 501 and the gaming profile $505_2$ with the home 502 as shown in the association table 400 in FIG. 4. Using the information collected, and particularly evaluating the associations made, the VWIM may assist the user in managing avatar identity and behavior.

Figure 6:
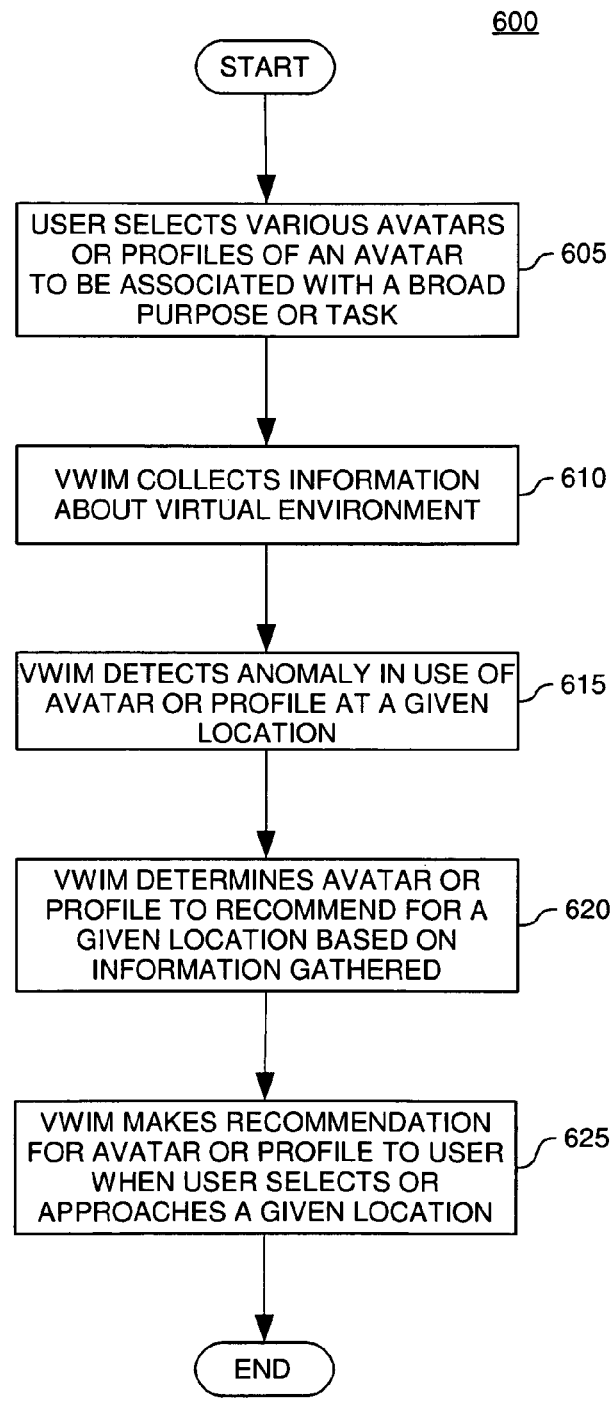
FIG. 6 illustrates a method of managing avatar identities in the virtual world, according to one embodiment of the invention.

FIG. 6 illustrates a method 600 of managing avatar identities in the virtual world, according to one embodiment of the invention. The steps of FIG. 6 generally correspond to FIG. 3, except that FIG. 6 illustrates a method of managing a user's virtual manifestations according to predefined associations between avatar profiles and particular locations in the virtual world, according to one embodiment. As shown the method 600 begins at step 605 where, the user selects various tasks to be associated with a given avatar profile or a given avatar. At step 610, the VWIM collects information about the virtual environment of the user. For example, the VWIM may collect information about virtual locations and the avatars at these locations, including the avatar of the user. For example, assume a user of a virtual world has a business profile and a research profile. Further, assume the user visits many locations in the virtual world multiple times, including a business area. By collecting and evaluating data about the virtual environment of the user, the VWIM may associate the business profile 92% of the time when visiting the business area, while the research profile is only associated 8% of the time.

Further, in one embodiment, the VWIM may monitor the globally-known (i.e., publicly accessible to the users of the virtual world) tasks (e.g., gaming, business, research) employed by other users at these locations. That is, the VWIM may, for example, request, from the virtual world application, the associated tasks of their avatars and tally and evaluate the information when received from the virtual world application, thereby indirectly monitoring the profiles of other users. Another possibility may include the server system monitoring and compiling the statistics of the other users in a given location and providing the statistics of other users in the location when requested by the VWIM. For example, assume a virtual world includes a main commerce area or mall. The VWIM, or another software component (e.g., a software component on the server system), may collect data about tasks or profiles of other users at the mall. The VWIM, or the other software component, may evaluate this data and determine other users employ gaming profiles 30% of the time, business profiles 10% of time, research profiles 20% of the time, and unspecified profiles 40% of the time when at the mall. Alternatively, the VWIM may determine or guess the tasks or profiles of other users based on the environment, including the location and physical (i.e., visual) attributes of the avatars.

In one embodiment, as the user visits more locations over time, the VWIM may use the data collected to make associations between profiles or tasks employed and given locations. At step 615, using the associations, the VWIM detects an anomaly in the use of an avatar or profile at a given location. In this regard, "detecting anomalies" refers to detecting that the current virtual manifestation of the user differs from the statistically determined virtual manifestation, as derived from the information collected by the VWIM and represented by the stored associations. In other words, the VWIM determines that the current profile (or avatar) does not fit the particular context, based on the predefined associations. At step 620, the VWIM may determine an avatar or avatar profile to recommend for the user at a given location using the information gathered. At step 625, the VWIM makes a recommendation for an avatar or avatar profile for the user to employ when the user selects or approaches a given location. A recommendation may include dynamically offering an appropriate action or response (e.g., recommend the user switch the current profile to a profile commonly used by the user in the given location or one that more closely matches the profiles of other users in the given location) or even automatically changing the avatar profile based on the tasks or profiles of other users currently being (in real-time) at the given location. In one embodiment, this recommendation may be made before or while the avatar is performing the anomaly. That is, the VWIM may dynamically prompt a user to change their profile when the user selects a new location, or when the avatar of the user approaches the new location, as determined by predefined distances or thresholds (e.g., three strides of the avatar from a house or by entering the doorway of a building).

Figure 7:
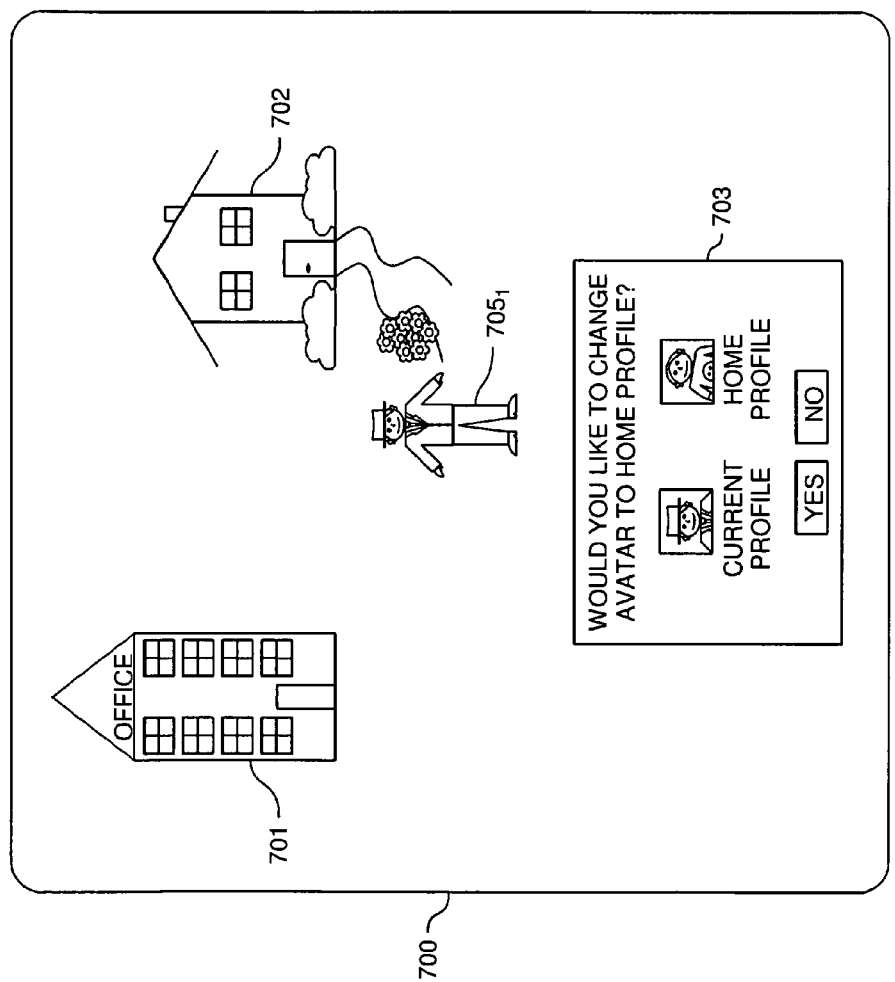
FIG. 7 illustrates an example display of an avatar of the user approaching a location in the virtual world and receiving a visual prompt from the identity manager to change avatar, according to one embodiment of the invention.

FIG. 7 illustrates a user display 700 depicting an avatar of the user approaching a location in the virtual world and receiving a visual prompt from an identity manager to change avatar, according to one embodiment of the invention. Illustratively, the avatar profile $705_1$ is shown approaching a non-work location or home 702 after leaving a work location or office 701. As shown, the display 700 also includes a user prompt 703. Avatar $705_1$ represents the user employing avatar profile $505_1$. Office 701 represents the office 501. Home 702 represents the home 502. User prompt 703 represents a visual dialog box depicting a prompt by the VWIM to change current profile to a more appropriate profile.

In one embodiment, the VWIM, using the information collected, may recommend that the user change a profile to a more appropriate profile when the user selects a destination or when the avatar of the user approaches a virtual location. For example, assume in the previous scenario that avatar profile $505_1$ is mainly employed by the user at the work 501 and that the profile $505_2$ used at the home 502. The VWIM may associate the work profile $505_1$ with the office 501 and the gaming profile $505_2$ with the home 502 and, as shown, the VWIM may recommend or prompt the user to change the avatar $705_1$ (i.e., the avatar employing the work profile $505_1$) to the gaming profile $505_2$ when the user approaches the home 702. Of course, embodiments of the invention are not limited to these examples and one of ordinary skill in the art will readily recognize that the invention may be adapted for use with various criteria in evaluating whether and how to assist the user in changing virtual identities, including fashion or clothing, visual representation, hairstyles, and behavior of an avatar or profile.

Figure 8:
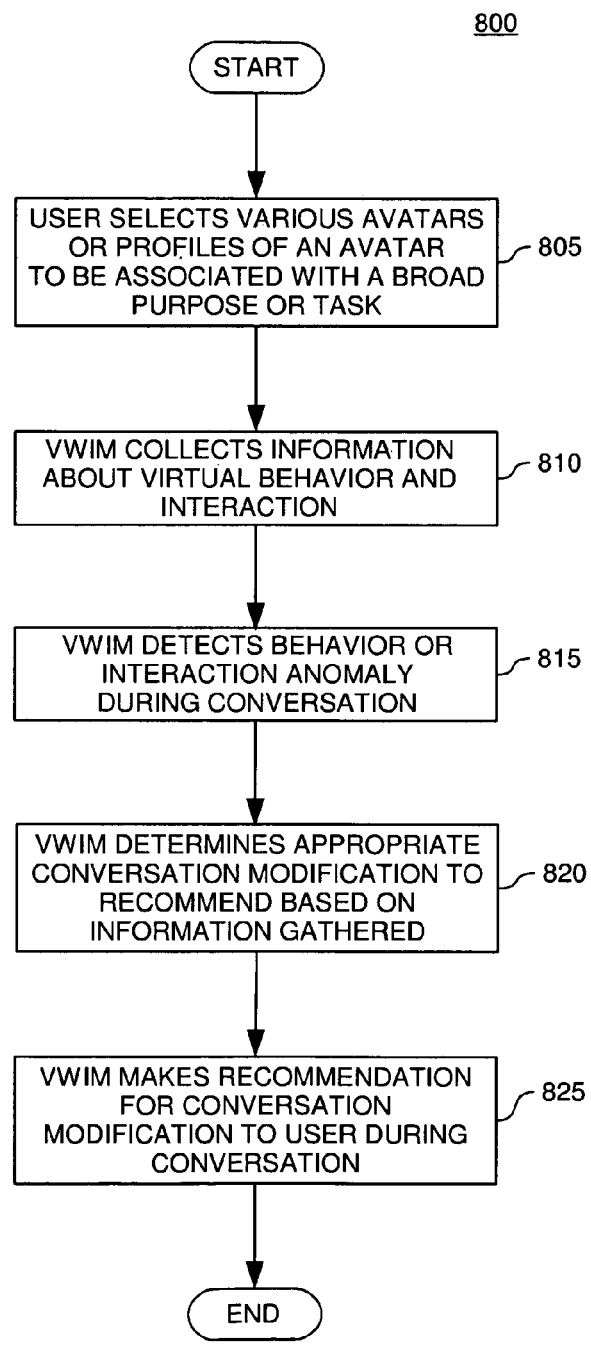
FIG. 8 illustrating a method of managing avatar behavior in the virtual world, according to one embodiment of the invention.

FIG. 8 illustrates a method 800 of managing avatar behavior in the virtual world, according to one embodiment of the invention. The steps of FIG. 8 generally correspond to FIG. 3, except that FIG. 8 illustrates a method of managing a user's behavior according to predefined associations between avatar profiles and conversational contexts, according to one embodiment. As shown the method 800 begins at step 805 where, the user selects various tasks to be associated with a given avatar profile or avatar. At step 810, the VWIM collects information about the virtual behavior and interaction of the avatar profile or avatar employed by the user. For example, the VWIM may monitor and track text conversations of a user, including conversational topics, grammar (e.g., use of slang, profanity, and spelling), and virtual environment (e.g., other users in these conversation and virtual location of these conversation). In one embodiment, as the user visits more locations over time, the VWIM may use the data collected to make associations between profiles or tasks employed and given locations. At step 815, using the associations, the VWIM detects behavior or interaction anomalies during a conversation. In other words, the manager determines that the behavior or interaction of the avatar does not fit the particular context, based on the predefined associations. At step 820, the VWIM may determine an appropriate conversation modification to recommend using the predefined associations. At step 825, the VWIM notifies the user of the conversation anomaly and makes a recommendation for the determined modification during a conversation. A recommendation may include dynamically offering a conversational replacement (e.g., correcting spelling or replacing words with appropriate slang) or even automatically inserting or deleting grammatical anomalies. In one embodiment, this recommendation is made when the user attempts to send a message. That is, the VWIM may dynamically prompt a user to change their message and, optionally, recommend an appropriate replacement before the message is sent to other users.

Figure 9:
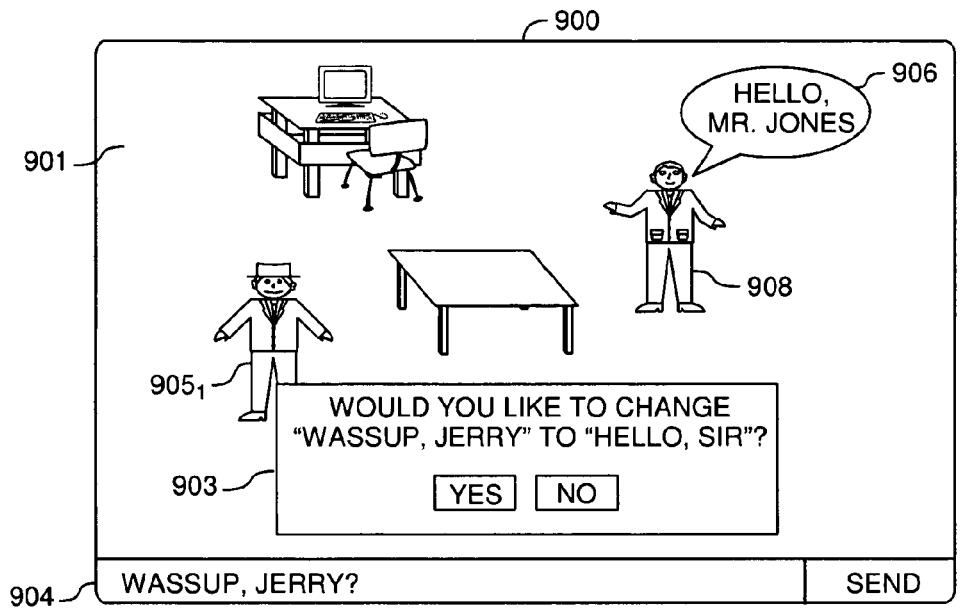
FIG. 9 illustrates an example display of the user in conversation with another user in the virtual world and receiving a visual prompt from the identity manager to change response, according to one embodiment of the invention.

FIG. 9 illustrates an example user display 900 of the user in conversation with another user in the virtual world and receiving a visual prompt from an identity manager to change response, according to one embodiment of the invention. In this example, the user is represented by a user avatar $905_1$, and an employer or boss of the user is represented by a third party avatar 908, both located in a work location or office 901. Illustratively, the boss avatar 908 is conversing with the user avatar $905_1$ using a visual text message 906. As shown, the user display 900 also includes a user text input area 904, and a user prompt 903. The input area 904 allows the user to type and send a response to the text message 906 by including a text input area and a send button. As stated, the VWIM may monitor the virtual experience of a user, including virtual behavior of the user as a given avatar or profile and interaction of the user with others (e.g., conversations between users, tasks or profiles during the conversations, and location of the conversations) through the avatar or profile.

In one embodiment, the VWIM may monitor messages received and sent by the user, using text processing technologies. Further, in one embodiment, the VWIM may dynamically prompt the user if the user is attempting to send an inappropriate message. That is, in this example, the VWIM may notify the user after a response to message 906 is typed and after the user selects or clicks the send button in the input area 904. Using the information collected from previous conversations or interactions and related associations, the VWIM may be configured to determine and prevent an inappropriate response from being sent (e.g., a message including an uncommon grammatical usage within a given group or in a given location or environment) unless the user approves or ratifies the message. Further, the VWIM may evaluate the information collected and, optionally, provide a recommendation of an appropriate response, including removing (e.g., profanity or improper slang) or adding (e.g., articles and punctuations) portions. For example, the user represented by avatar 905₁ may be attempting to send an inappropriate, informal greeting (e.g., "Wassup, Jerry?") to his boss represented by avatar 908. Such a scenario is illustrative and may be the result of a hotkey or macro setup in which default greetings and first names are employed automatically. Of course, the user may have just typed the message carelessly. In any event, the VWIM may notify the user that this response is inappropriate and may offer an appropriate equivalent greeting (e.g., "Hello, Sir"). Further still, the VWIM may automatically make revisions to inappropriate messages before allowing the messages to be sent by the virtual world client application.

Figure 10:
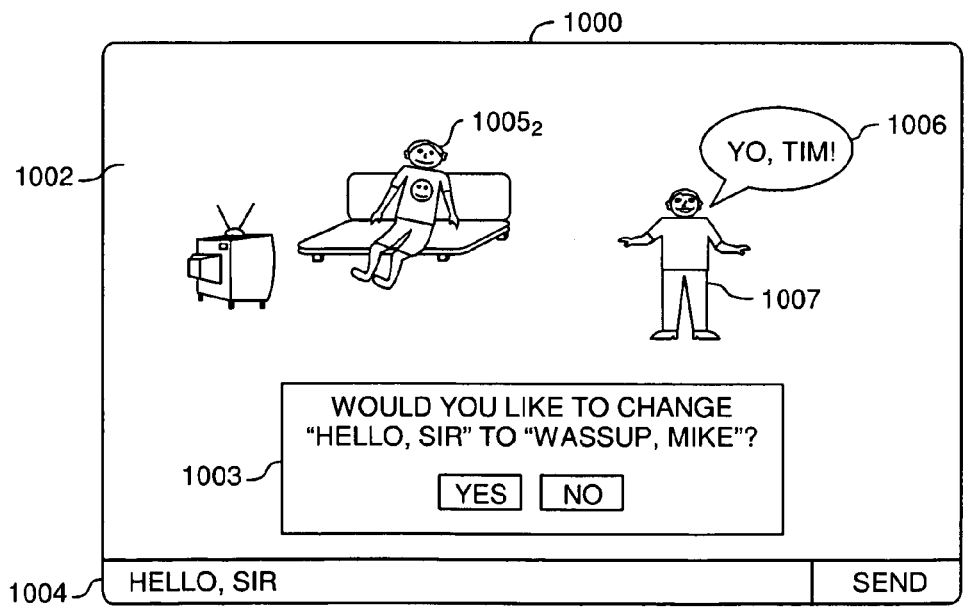
FIG. 10 illustrates an example display of the user in conversation with a different other user in the virtual world and receiving a visual prompt from the identity manager to change response, according to one embodiment of the invention.

FIG. 10 illustrates a user display 1000 of the user in conversation with a different user in the virtual world and receiving a visual prompt from an identity manager to change response, according to one embodiment of the invention. In this example, the user is represented by a user avatar 1005₂, and a peer or friend of the user is represented by a third party avatar 1007, both located in a recreational location or home 1002. Illustratively, the friend avatar 1007 is conversing with the user avatar 1005₂ using a visual text message 1006. As shown, the user display 1000 also includes a user text input area 1004, and a user prompt 1003. The input area 1004 allows the user to type and send a response to the text message 1006 by including a text input area and a send button.

In contrast to the example of FIG. 9, the user represented by avatar 1005₂ may be attempting to send an awkwardly, formal greeting (e.g., Hello, Sir") to his friend represented by avatar 1007. Again, such scenario is illustrative and may be the result of a hotkey or macro setup in which default greetings are employed and first names are unknown. Of course, the user may have just typed the message carelessly. In any event, the VWIM may notify the user that this response is inappropriate and may offer an appropriate equivalent greeting (e.g., "Wassup Mike?"). Further still, the VWIM may automatically make revisions to inappropriate messages before allowing the messages to be sent. Of course, embodiments of the invention are not limited to these examples and one of ordinary skill in the art will readily recognize that the invention may be adapted for use with a variety of technologies and devices configured to allow the user of the virtual world to interact with the virtual environment and with other users within the virtual world.

For illustration purposes only, descriptions herein refer to the behavior or interaction of avatars mainly through text conversations. However, embodiments may be adapted for use where avatars interact in other ways and, further, behavior may be unrelated to communication with other users. For example, the avatars may communicate through actions, gestures, or signals and behavior modifications other than language communication (e.g., facial or visual expressions of the avatars and attitude) are contemplated.

Additionally, methods 600 and 800 are provided for illustrative purposes only, and are not limiting of the invention. It is contemplated that the steps of methods 600 and 800 may be modified to incorporate other criteria for managing avatar profiles or avatars, including their behavior, in a virtual world. Such modifications may be made to suit particular situations, and are thus contemplated to be in the scope of the invention.

Further, the associations represented in the data structure 400 were illustratively described as statistical associations. However, other embodiments are contemplated. For example, the associations may be arbitrarily defined by a user. Thus, a user may explicitly specify that a particular profile (profile X) should always be applied when the user's avatar is in a given location (location Y). In this case, the corresponding association is not necessarily a statistical derivation, but simply a user-defined preference.

While the foregoing is directed to embodiments of the present invention, other and further embodiments of the invention may be devised without departing from the basic scope thereof, and the scope thereof is determined by the claims that follow.

What is claimed is:

1. A computer-implemented method of assisting users in the management of avatars in a virtual environment, the method comprising: storing a plurality of avatar profiles, each profile defining attributes for a respective avatar;
    collecting information about a virtual experience of a user controlling an avatar in the virtual environment, wherein the avatar has a first profile among the plurality of profiles applied thereto;
    creating associations between the first profile and the collected information to define profile management criteria, wherein the profile management criteria reflect one or more statistically most commonly used avatar attributes by avatars of other users at a given location in the virtual environment and further reflect a statistically most commonly used profile among the plurality of profiles at the given location, and wherein the profile management criteria are defined to promote a context-appropriate manifestation of the avatar, as expressed by a selected profile among the plurality of avatar profiles, according to statistical conclusions derived from the collected information;
    while monitoring the avatar interacting with the virtual environment, determining when one or more of the profile management criteria are satisfied based on a current state of the avatar relative to the virtual environment; and
    upon determining that one or more of the profile management criteria are satisfied, dynamically selecting a second profile among the plurality of profiles to be applied to the avatar to replace the first profile.

2. The method of claim 1, further comprising prompting the user to confirm application of the selected second profile to the avatar.

3. The method of claim 1, wherein creating associations between the first profile and the collected information includes associating virtual locations to the first profile, based on the collected information.

4. The method of claim 1, wherein the profile management criteria reflect that the second profile is statistically most commonly used by the user at the given location, and wherein determining when one or more of the profile management criteria are satisfied comprises determining that the first profile is being applied while the avatar is at the given location.

5. The method of claim 1, further comprising:
    receiving user input configured to cause a user-requested behavioral response by the avatar; and
    upon determining that one or more of the profile management criteria are satisfied, dynamically selecting a modified behavioral response for the avatar to replace the user-requested behavioral response.

6. A non-transitory computer readable medium containing a program which, when executed, performs an operation comprising: storing a plurality of avatar profiles, each profile defining attributes for a respective avatar;
    collecting information about a virtual experience of a user controlling an avatar in the virtual environment, wherein the avatar has a first profile among the plurality of profiles applied thereto;
    creating associations between the first profile and the collected information to define profile management criteria, wherein the profile management criteria reflect one or more statistically most commonly used avatar attributes by avatars of other users at a given location in the virtual environment and further reflect a statistically most commonly used profile among the plurality of profiles at the given location, and wherein the profile management criteria are defined to promote a context-appropriate manifestation of the avatar, as expressed by a selected profile among the plurality of avatar profiles, according to statistical conclusions derived from the collected information;

while monitoring the avatar interacting with the virtual environment, determining when one or more of the profile management criteria are satisfied based on a current state of the avatar relative to the virtual environment; and upon determining that one or more of the profile management criteria are satisfied, dynamically selecting a second profile among the plurality of profiles to be applied to the avatar to replace the first profile.

7. The computer readable storage medium of claim 6, further comprising prompting the user to confirm application of the selected second profile to the avatar.

8. The computer readable storage medium of claim 6, wherein creating associations between the first profile and the collected information includes associating virtual locations to the first profile, based on the collected information.

9. The computer readable storage medium of claim 6, wherein the profile management criteria reflect that the second profile is statistically most commonly used by the user at the given location, and wherein determining when one or more of the profile management criteria are satisfied comprises determining that the first profile is being applied while the avatar is at the given location.

10. The computer readable storage medium of claim 6, further comprising:

receiving user input configured to cause a user-requested behavioral response by the avatar; and upon determining that one or more of the profile management criteria are satisfied, dynamically selecting a modified behavioral response for the avatar to replace the user-requested behavioral response.

11. A computer-implemented method of assisting users in the management of avatars in a virtual environment, the method comprising:

providing a first virtual manifestation of a user in the virtual environment;

collecting information about a virtual experience of the user controlling an avatar in the virtual environment, wherein the avatar has the first virtual manifestation applied thereto;

creating associations between the first virtual manifestation and the collected information to define one or more identity management criterions, wherein the one or more identity management criterions reflect one or more statistically most commonly used attributes by virtual manifestations of other users at a given location in the virtual environment, and wherein the one or more identity management criterions are defined to promote a context-appropriate manifestation of the avatar according to statistical conclusions derived from the collected information;

while monitoring the avatar interacting with the virtual environment, determining when at least one of the one or more identity management criterions are satisfied based on a current state of the avatar relative to the virtual environment; and upon determining that at least one of the one or more identity management criterions is satisfied, dynamically selecting second virtual manifestation to be applied to the avatar to replace the first virtual manifestation.

12. The method of claim 11, wherein the first virtual manifestation is a first avatar profile, and wherein the second virtual manifestation is a second avatar profile.

13. The method of claim 11, wherein the one or more identity management criterions include the first virtual manifestation selecting or approaching a given virtual location in the virtual environment.

\* \* \* \* \*